United States Patent
Rinklake et al.

(10) Patent No.: US 6,182,404 B1
(45) Date of Patent: Feb. 6, 2001

(54) SUB-ROOFING ELEMENT, ON A ROOF, FOR A FLAT, PLATE-SHAPED STRUCTURAL ELEMENT

(75) Inventors: Manfred Rinklake, Gross-Umstadt; Norbert Rösler, Oberursel, both of (DE)

(73) Assignee: Lafarge Braas GmbH, Oberursel (DE)

( * ) Notice: Under 35 U.S.C. 154(b), the term of this patent shall be extended for 0 days.

(21) Appl. No.: 09/163,895

(22) Filed: Sep. 29, 1998

Related U.S. Application Data

(63) Continuation-in-part of application No. PCT/DE97/00647, filed on Mar. 27, 1997.

(30) Foreign Application Priority Data

Mar. 29, 1996 (DE) .............................................. 196 12 490

(51) Int. Cl.[7] .................................................. E04D 13/18
(52) U.S. Cl. ........................... 52/173.3; 52/478; 52/536; 52/546; 52/550; 52/551; 136/244; 136/206
(58) Field of Search .................................. 52/173.3, 478, 52/518, 519, 531, 533, 534, 536, 543, 544–546, 550–553; 136/244, 251, 243, 206

(56) References Cited

U.S. PATENT DOCUMENTS

| | | | |
|---|---|---|---|
| 670,723 | * 3/1901 | Nebeling | 52/536 X |
| 3,909,998 | * 10/1975 | Simpson | 52/536 X |
| 4,130,974 | * 12/1978 | Chalmers et al. | 52/531 |
| 4,406,106 | * 9/1983 | Dinges | 52/543 X |
| 4,574,536 | * 3/1986 | Bamber et al. | 52/536 X |
| 4,636,577 | * 1/1987 | Peterpaul | 136/244 X |
| 4,929,179 | * 5/1990 | Breidenbach et al. | 432/247 |
| 4,936,063 | * 6/1990 | Humphrey | 52/200 |
| 5,155,966 | * 10/1992 | Breidenbach et al. | 52/747.11 |
| 5,164,020 | * 11/1992 | Wagner et al. | 52/173.3 X |
| 5,214,895 | * 6/1993 | Fifield | 52/536 X |
| 5,385,614 | * 1/1995 | Albright et al. | 136/244 |
| 5,409,549 | * 4/1995 | Mori | 136/244 |
| 5,642,596 | * 7/1997 | Waddington | 52/546 |
| 5,743,059 | * 4/1998 | Fifield | 52/536 X |

FOREIGN PATENT DOCUMENTS

| | | | |
|---|---|---|---|
| 3314637 | 11/1993 | (DE) | . |
| 682831 | 11/1993 | (CH) | . |
| 9409453 | 9/1994 | (DE) | . |
| 0547285 | 6/1993 | (EP) | . |
| 1386138 | * 12/1964 | (FR) | 52/536 |
| 6582 | * 4/1884 | (GB) | 52/536 |
| 2266903 | 11/1993 | (GB) | . |

* cited by examiner

*Primary Examiner*—Carl D. Friedman
*Assistant Examiner*—Winnie Yip
(74) *Attorney, Agent, or Firm*—Nils H. Ljungman & Associates

(57) ABSTRACT

A sub-roofing element for a flat, plate-shaped structural element, in particular for a solar energy collection module that can be fastened to joist elements that can be laid on a pitched roof in the ridge-eaves direction, whereby the sub-roofing element is made of watertight material and has at least one water channel.

2 Claims, 11 Drawing Sheets

SUB-ROOFING ELEMENT, ON A ROOF, FOR A FLAT, PLATE-SHAPED STRUCTURAL ELEMENT

CONTINUING APPLICATION DATA

This application is a Continuation-In-Part application of International Application No. PCT/DE97/00647, filed on Mar. 27, 1997, which claims priority from Fed. Rep. of Germany Patent Application No. 196 12 490.5, filed on Mar. 29, 1996. International Application No. PCT/DE97/00647 was pending as of the filing date of the present U.S. application and the U.S. was an elected state in the International Application No. PCT/DE97/00647.

BACKGROUND OF THE INVENTION

1. Field of the Invention

This present invention relates to a sub-roofing element for a flat, plate-shaped structural element, in particular for a solar energy collection module that can be fastened to joist elements that can be laid on a pitched roof in the ridge-eaves direction, whereby the sub-roofing element is made of watertight material and has at least one water channel.

2. Background Information

Such a system is described in German Patent No. 94 09 453.9 U1, for example. In this system, modules are arranged so that they overlap one another in the longitudinal direction of the roof. In this specification, the longitudinal direction is called the ridge-eaves line, and the transverse direction is designated a line parallel to the ridge or to the eaves. As the joist elements, there are wooden profiles laid in the edge-eaves direction which, on their ridge-side end, are in contact with a roof batten and on their eaves-side end are in contact with a wooden batten that is laid parallel to a roof batten and adjacent to the latter. The wooden batten projects beyond the upper edge of the roof batten by approximately the thickness of the module.

The wooden profiles, on their surface, have a depression that runs in the longitudinal center, so that this depression, when located on the edges of two modules butted against one another, serves as a drain channel for the discharge of any water that may have penetrated into the gap. Some of the disadvantages of this system are that additional wooden battens must be laid parallel to the roof battens, and that additional stays that are engaged around the eaves-side edge of the modules are necessary for fastening.

European Patent No. 0 547 285 and German Patent No. 33 14 637 disclose a roofing plate that can be provided on its upper side with a small-format module. The roofing plate is provided on one longitudinal edge with a water channel or drip edge, and on the other longitudinal edge with a cover channel or water stop. The module is always supported on the roofing plate close to the water channel and the cover channel. When the roof is being laid, the roofing plates are laid in a course parallel to the eaves, whereby one roofing plate, with its cover channel, always overlaps the water channel of a neighboring roofing plate in the same course, so that no rain water can penetrate between the roofing plates.

OBJECT OF THE INVENTION

The object of the invention is to create a seal for a system of structural elements, in particular a solar energy collection system, in which the structural elements are butted up against one another in the transverse direction and against neighboring roofing tiles, partly overlap one another in the longitudinal direction, and are laid on joist elements that are located at a distance from a butt joint.

SUMMARY OF THE INVENTION

The invention teaches that this object can be accomplished if the sub-roofing element on the joist elements and underneath a plate-shaped structural element can be laid and is shaped so that there is at least one raised bead that runs in the ridge-eaves direction, can receive a joist element and the bead is wider than the joist element, so that the sub-roofing element can be displaced parallel to the eaves, and so that the water channel can be located underneath the longitudinal edges of two plate-shaped elements butted up against one another. Preferably, the joist elements are laid in lines tangent to approximately the quarter points, or quarter-chord points, of the structural elements, so that the transverse distance between two joist elements equals one-half the width of a structural element. It is therefore advantageous to provide sub-roofing elements at approximately one-half the width of the structural elements. For example, sub-roofing elements that have outside dimensions of 42.1 cm×64.4 cm for use with photovoltaic modules that have outside dimensions of approximately 38 cm×120 cm., the width dimension which is greater than one-half the width results from the fact that two neighboring sub-roofing elements are laid so that their edges overlap. An overhang in the longitudinal direction makes possible good ventilation on the underside of the photovoltaic modules.

A sub-roofing element essentially does not need to absorb any bearing forces, so that it can be made of a plastic film, i.e. one that can be manufactured using a deep drawing, or swedging, or extrusion process, to provide several raised or recessed beads. When very thin material is used, the use of a reinforcement is recommended in the vicinity of the water channel, which can be realized in the form of a groove or trough, for example, as a separate component.

The sub-roofing element can lie on the upper side of the joist element and protect the underside of the structural element, if the sub-roofing element has a penetration at least in the vicinity of the eaves-side terminal segment of the raised bead that contains the joist element, through which penetration a locator of the joist element for the plate-shaped structural element can be inserted.

A tight laterally overlapping laying of the sub-roofing elements is possible if, in the vicinity of both longitudinal edges, at least one raised bead is provided, whereby the raised bead on one end can act as a receptacle for the raised bead on the other edge of a neighboring, identical sub-roofing element. Preferably, the raised bead is narrow on one edge and sufficiently wide on the other edge so that the narrow raised bead covered by the wide raised bead can be pushed sideways. Dimensional tolerances can thus be easily compensated during laying. In particular when installing structural elements that are laid on one side on the water channel of an adjacent roofing plate, but have a butt joint on the other side, their coverage width in the transverse direction for the structural element on top of the water channel is less than for another element. Therefore it is advantageous if the sub-roofing element laid adjacent to the water channel of the roofing plate can be displaced by the width of the water channel in the transverse direction toward the neighboring sub-roofing element.

To explain, in at least one embodiment of the present invention when a structural element is installed such that a longitudinal edge overlaps the water channel of an adjacent roofing plate, the amount of this overlap can reduce the transverse coverage width which the sub-roofing elements preferably cover, as compared to another possible structural element. Therefore, it is advantageous if the sub-roofing element laid adjacent to the water channel of the roofing plate can be displaced, or shifted, by the width of the water channel in the transverse direction toward the neighboring sub-roofing element.

This capability can be achieved if the receiving raised beads are wider than the raised beads or the joist to be received.

The sub-roofing element can create a particularly good seal for the peripheral area of a structural element lying on the water channel of a neighboring roofing plate if the peripheral segment of the longitudinal edge adjacent to the receiving raised bead is as wide as the receiving raised bead. The peripheral segment of the sub-roofing element can thereby be positioned underneath the water channel.

The receiving raised bead on one longitudinal edge and the water channel on the opposite longitudinal edge can be realized so that they are approximately complementary to one another, if the water channel is realized so that it is adjacent to the receiving raised bead.

Not only can the sub-roofing element drain off any water that has penetrated, but it can also influence the ventilation underneath the structural elements, if the longitudinal edges and the eaves-side edge of the sub-roofing element run at the height of the low areas, or recessed areas, and the ridge-side edge runs at the height of the equally-high raised beads, whereby all the raised beads have the same height.

The objective is to have a controlled ventilation, to conduct a cooling air current along the underside of a photovoltaic module. In midsummer in particular, it thereby becomes possible to prevent excessive heating and the related decrease in the efficiency of a photovoltaic module. Advantageously, the heated air being discharged at the ridge-side edge is guided along the underside of the following sub-roofing element, so that the heated air does not come into contact with other photovoltaic modules before it is exhausted at the ridge. To achieve this ventilation, a sub-roofing element is preferably longer than a photovoltaic module. The sub-roofing element projects beyond the ridge-side edge of the photovoltaic module, so that the air that enters at the eaves-side edge can be discharged toward the ridge.

The penetration of snow and small animals in the gap between the overlapping structural elements can be prevented if there are baffles that form labyrinths on the eaves-side edge of the sub-roofing element. These chambers form a labyrinth, through which nothing can pass directly.

The installation of the sub-roofing elements and of the joist elements is simplified if, on the ridge-side edge, there is at least one suspension lug for the suspension of the sub-roofing element on a roof batten or a similar structure. The sub-roofing element is thereby adjusted in the longitudinal direction with respect to the ridge-side upper edge of the roof batten. If the distance between the suspension lugs and the eaves-side edge is essentially equal to the distance between the suspension lugs and the eaves-side edge of a neighboring roofing plate, the result for the sub-roofing elements claimed by the invention is the same geometric position as for the neighboring roofing plates, regardless of the actual distance between the roof battens. This distance can vary from roof to roof on account of the overlap of the roofing plates, which is a function of the pitch of the roof.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The accompanying drawings illustrate at least one preferred exemplary embodiment of the invention which is explained in greater detail below, wherein.

DESCRIPTION OF THE PREFERRED EMBODIMENT

Figure 1:
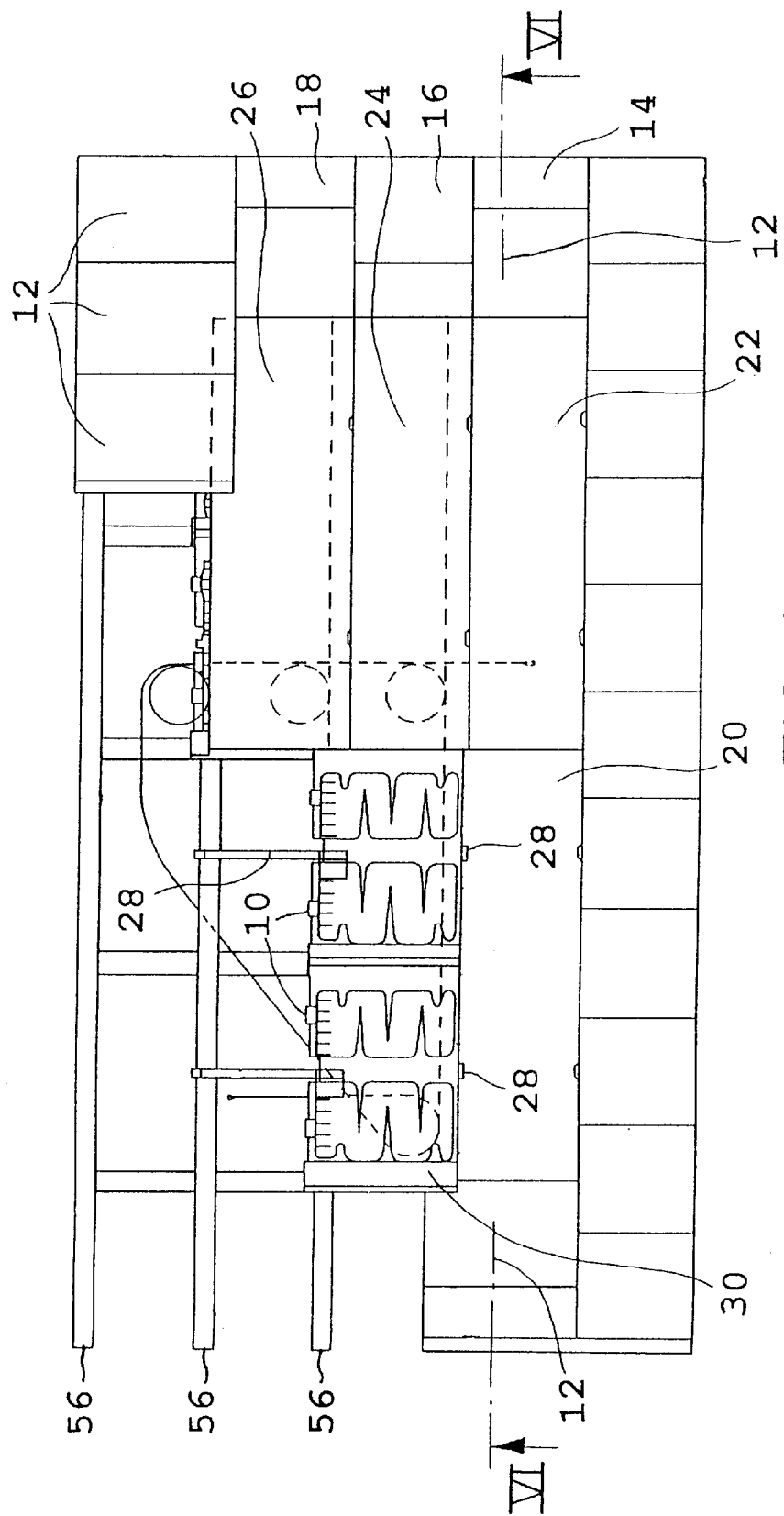
FIG. 1 shows the installation on a roof, in an overhead view.

FIG. 1 shows a schematic overhead view of the status during construction with the sub-roofing elements 10 on a pitched roof partly covered with flat roofing plates 12 made of concrete and laid in offset courses 14, 16, 18. The figure shows structural elements in the form of solar energy photovoltaic modules 20, 22, 24, 26 on the roof. In the second course 16, in an area not covered with photovoltaic modules, there are sub-roofing elements 10, and in the course 18 above that, there are joist elements 28 shown in the early stages of construction. The sub-roofing elements 10, after installation, lie underneath the photovoltaic modules and above the joist elements which support the photovoltaic modules.

The sub-roofing elements 10 are approximately one-half as wide as a photovoltaic module 20, 22, 24, 26 and each of them has a trough-shaped water channel 30 on its left edge as illustrated in FIG. 1. The photovoltaic modules 20, 22 laid next to one another in the lowermost course 14 are butted up against one another. On its other end, the photovoltaic module 22 is in contact with the water channel of the neighboring roofing plate 12, while the photovoltaic module 20 is butted up against the cover channel of the neighboring roofing plate 12. Underneath the butt joints, there are water channels of sub-roofing elements not visible here underneath the photovoltaic modules 20 and 22, which sub-roofing elements are identical to the visible sub-roofing elements 10.

Figure 2:
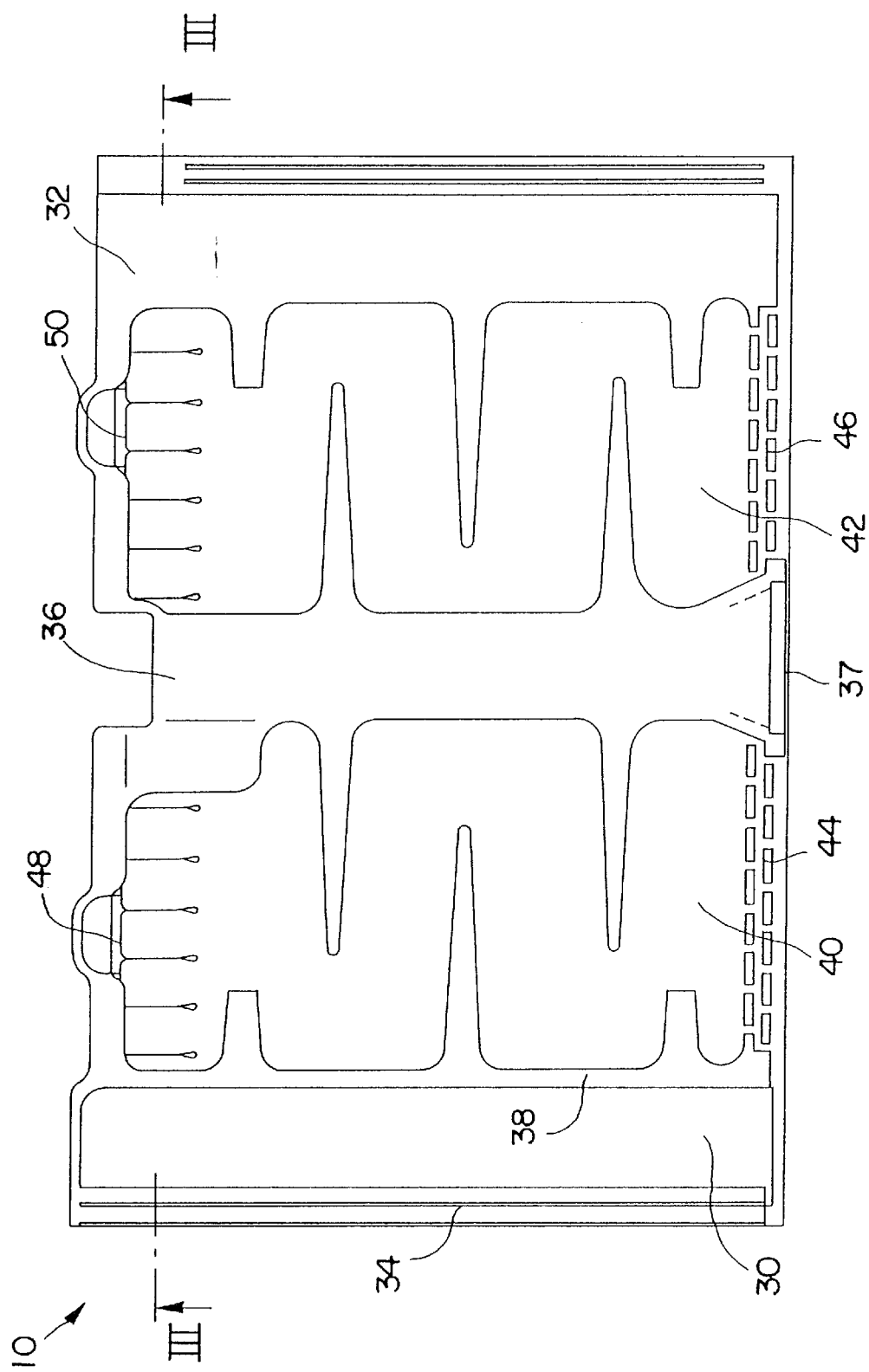
FIG. 2 shows a sub-roofing element as claimed by the invention, in an overhead view.

FIG. 2 illustrates a sub-roofing element 10 as claimed by the invention in an overhead view. This element can consist of a sheet of deep-drawn plastic film. With outside dimensions of 42.1 cm×64.4 cm×1.3 cm, the sub-roofing element 10 is suitable for a photovoltaic module having the dimensions 38 cm×120 cm, whereby two sub-roofing elements 10 are designed to be laid next to one another underneath a photovoltaic module. On the left side as illustrated in FIG. 2, there is a water channel 30 that is realized in the form of a wide hollow recessed bead, while on the right-hand side there is a parallel wide outer raised hollow bead 32. On the outer longitudinal edge of the water channel 30 there is a narrow, double outer raised bead 34, which can be adapted to the bottom contour of the cover channel of a roofing plate 12, and can be received by the underside of the wide raised bead 32 of a neighboring sub-roofing element. A wide central or inner hollow raised bead 36 is provided having a recessed underside which provides a receptacle for the joist element, which supports the structural element or photovoltaic module. In the vicinity of its eaves-side terminal segment, the raised bead 36 that acts as a receptacle for the joist element has a penetration 37 connecting upper and lower surfaces of the terminal segment of the bead 36, through which a channel member attached to the joist element (to be described) can be inserted. The inner edge of the water channel forms a narrow raised bead 38. All the raised beads 32, 34, 36 and 38 run in the longitudinal direction, i.e. on the roof from the ridge to the eaves.

Between the raised beads 38 and 36 as well as 36 and 32 there are recessed areas 40 and 42 respectively, which can be provided with toothed reinforcement ribs that run in the transverse direction but not over the entire width of a recessed area 40, 42. On the eaves-side edge of each of the recessed areas 40, 42, there are two rows of baffles 44 and 46 respectively that form labyrinths which allow air to flow under a structural element supported by a sub-roofing element. On the ridge-side edge of each recessed area 40, 42, there is a suspension lug 48, 50.

Figure 3:
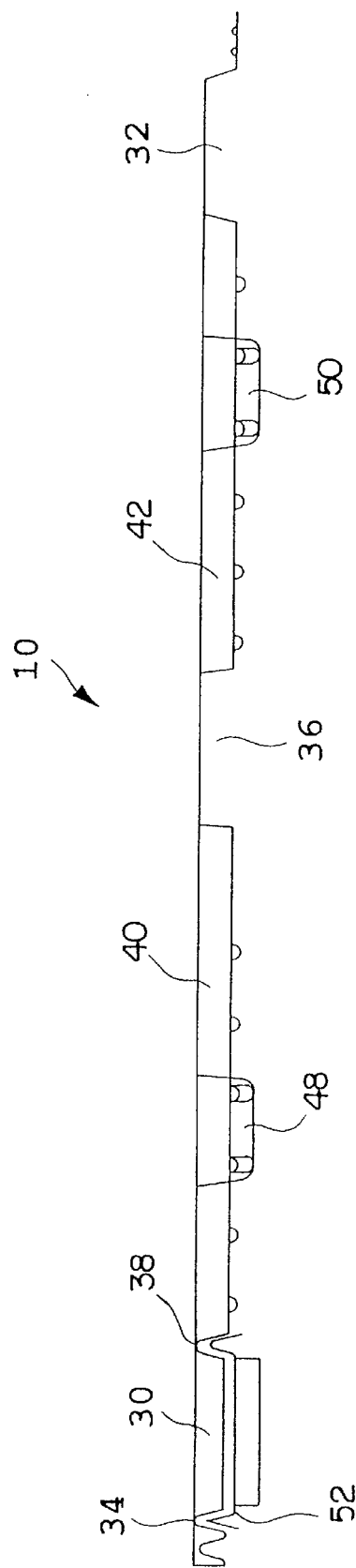
FIG. 3 shows the sub-roofing element illustrated in FIG. 2 in a cross section along line III—III.
Figure 4:
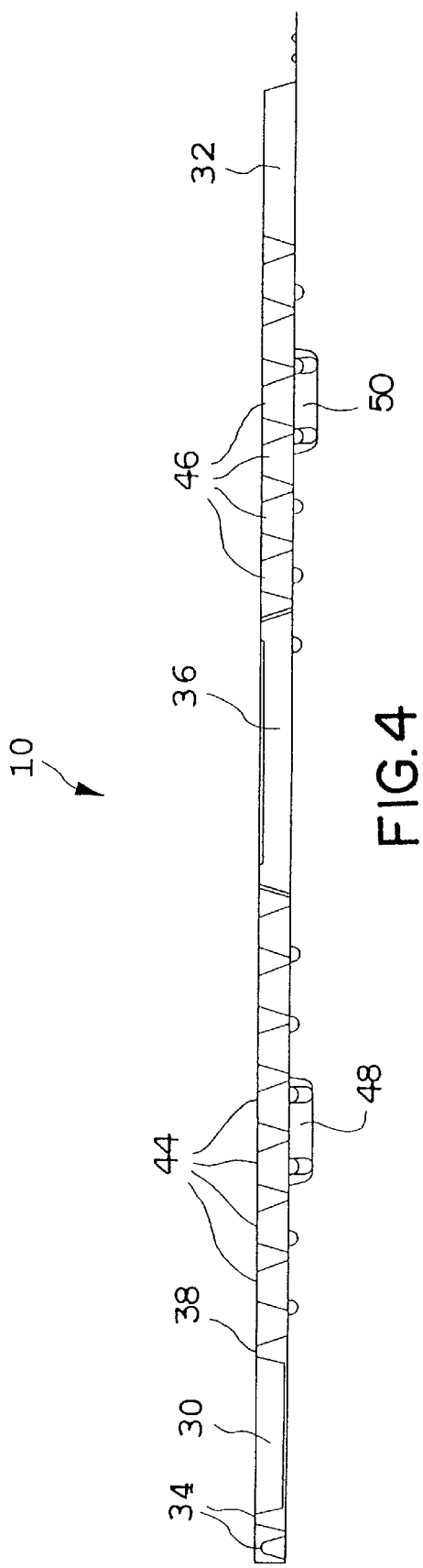
FIG. 4 shows the sub-roofing element illustrated in FIG. 2 in an end view, from the eaves side.
Figure 5:
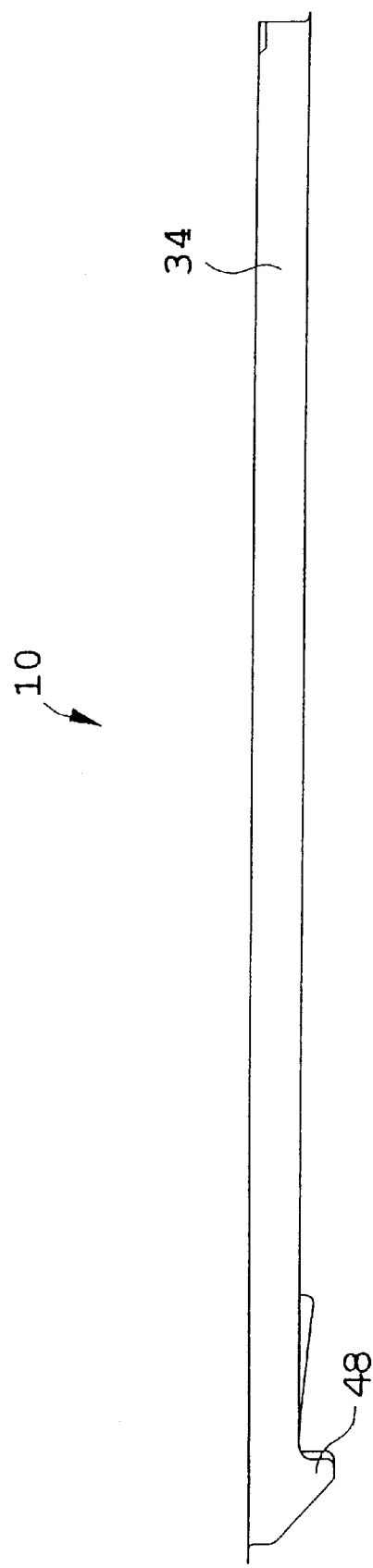
FIG. 5 shows the sub-roofing element illustrated in FIG. 2 in a side view.

FIGS. 3 to 5 illustrate the position and orientation of the raised beads 32, 34, 36 and 38 described above, of the water channel 30, of the recessed areas 40, 42, of the baffles 44 and 46 and of the suspension lugs 48 and 50.

To explain, in at least one possible embodiment the suspension lugs 48, 50, for the suspension of the sub-roofing element 10 on a roof batten or similar fixture, can possibly be formed as, or from, one single piece with the corresponding sub-roofing element 10. In another possible embodiment, the suspension lugs 48, 50 might possibly be formed separately from the sub-roofing element 10 and then later firmly attached or joined to the sub-roofing element 10. In at least one embodiment, these lugs 48, 50 can be attached to the roof batten. Further, in at least one embodiment of the present invention it is possible that these suspension lugs 48, 50 can be formed or placed at desired intervals or locations along the ridge-side edge of the sub-roofing elements.

In FIG. 3, below the water channel, there is a reinforcing component 52, in this case a channel preferably made of sheet metal. The side walls of this channel project into the raised beads 32 and 38. On the ridge-side edge, one tab is bent downward, so that the reinforcing component 52 can also be suspended on a roof batten.

Figure 6:
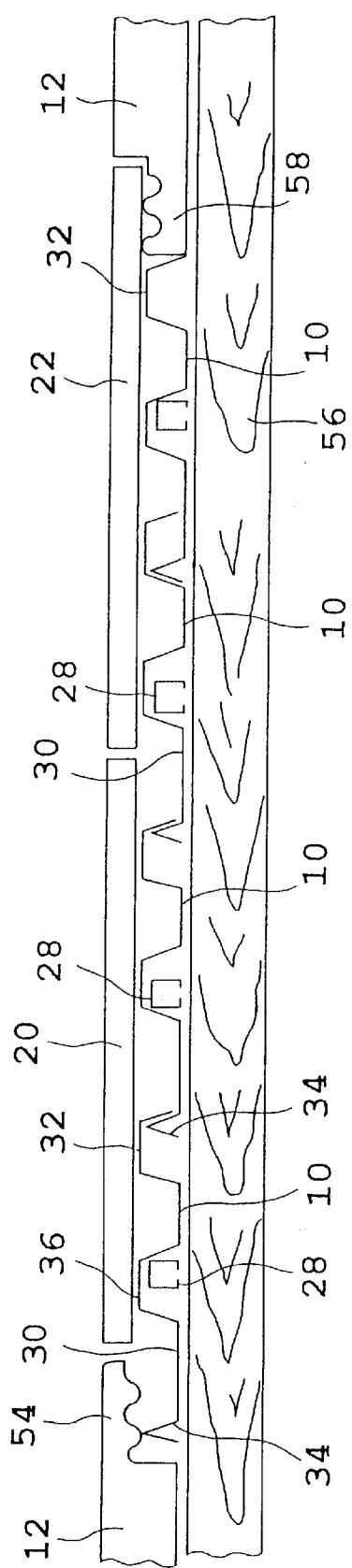
FIG. 6 shows the roof illustrated in FIG. 1, in a cross section along Line VI—VI parallel to the eaves, as viewed in the direction from the eaves toward the ridge.

FIG. 6 shows, in course 14 of the roof illustrated in FIG. 1, in a cross section along a line VI—VI parallel to the eaves, and shown in a view looking from the eaves to the ridge. In this case, on the left is the first roofing plate 12, which has a raised cover channel 54 on the right side. The first roofing plate 12 is followed by a first sub-roofing element 10, which is in contact with its narrow raised bead 34 running on the left longitudinal edge against the underside of the cover channel 54 of the first roofing plate 12, while the exposed longitudinal edge of the cover channel 54 is located above the water channel 30 of the first sub-roofing element 10. The first sub-roofing element 10 is penetrated in its transverse direction approximately centrally by a first joist element 28 which is fastened to a roof batten 56, which joist element is mounted so that it can move in the transverse direction within the recessed underside of the raised bead 36 located approximately in the center of the sub-roofing element 10. With its wide raised bead 32 running on the right longitudinal edge, the first sub-roofing element 10 covers the narrow raised bead 34 running on the left longitudinal edge of a second sub-roofing element 10, which is fastened in the same manner with a second joist element 28. In at least one embodiment this movement could possibly allow the joist to be positioned into a desirable position within the bead during installation of the joist 28.

So that two neighboring sub-roofing elements 10 retain their maximum dimension in the transverse direction, the second sub-roofing element 10 has been pulled to the right during the laying in the direction parallel to the eaves, so that its narrow raised bead 34 is located by the wide raised bead 32 of the first sub-roofing element 10. Located on the two joist elements 28 is the first photovoltaic module 20, which is butted up against the cover channel 54 of the first roofing plate 12 on the left and up against the neighboring second photovoltaic module 22 on the right. To the right of the second sub-roofing element 10, a third sub-roofing element 10 is laid in the manner described above. In this case, the joint of the photovoltaic module 20, 22 is located above the water channel 30 of the third sub-roofing element 10.

To the right of the third sub-roofing element 10, in a manner similar to that described above, a fourth sub-roofing element 10 is laid, which is butted with its wide raised bead 32 running on the right longitudinal edge against the left-side recessed water channel 58 of the second roofing plate 12. The third and fourth sub-roofing elements 10 are overlapped by the second photovoltaic module 22.

Because the first three sub-roofing elements 10 have each been laid with their maximum extension, and the fourth sub-roofing element 10 is butted up against the second roofing plate 12, the necessary coverage width of the fourth sub-roofing element 10 is smaller by the width of the water channel 58 of the second roofing plate 12 than the maximum extension. During laying, the fourth sub-roofing element 10 has therefore been shifted to the left by the width of the water channel 58 in the direction parallel to the eaves, so that its narrow raised bead 34 held by the wide raised bead 32 of the third sub-roofing element 10 is in contact against the left lateral surface of the wide raised bead 32 of the third sub-roofing element 10. During the shifting, the central raised bead 36 of the fourth sub-roofing element 10 that holds the joist element has been displaced relative to the joist element 28. The configuration of the sub-roofing elements 10 claimed by the invention therefore makes it possible to adjust the coverage width of a sub-roofing element 10 to the respective structural requirements.

One feature of the invention resides broadly in the sub-roofing element 10 for a flat, plate-shaped structural element, in particular for a photovoltaic module 20, 22, 24, 26, which can be fastened on a pitched roof with joist elements 28 that can be laid in the ridge-eaves direction, whereby the sub-roofing element 10 is made of watertight material and has at least one water channel 30, characterized by the fact that the sub-roofing element 10 can be laid on the joist elements 28 and underneath a plate-shaped structural element, and is shaped so that it has at least one raised bead 36 running in the ridge-eaves direction, which can locate a joist element 28 and has its underside wider than the joist element 28, so that the sub-roofing element 10 can be shifted parallel to the eaves, and so that the water channel 30 can be located underneath the longitudinal edges of two plate-shaped structural elements butted up against one another.

Another feature of the invention resides broadly in the sub-roofing element characterized by the fact that it is made of a plastic film.

Yet another feature of the invention resides broadly in the sub-roofing element characterized by the fact that the sub-roofing element 10, at least in the vicinity of the eaves-side terminal segment of the raised bead 36 holding the joist element 28, has a penetration 37, through which a member attached to the joist element 28 and forming a receptacle for the plate-shaped structural element can be inserted.

Still another feature of the invention resides broadly in the sub-roofing element characterized by the fact that in the vicinity of each of the two longitudinal edges there is at least one raised bead 32, 34, whereby a raised bead 32 on the one edge has an underside which is capable of interlocking and holding the top of the raised bead 34 on the other edge of a neighboring, identical sub-roofing element 10.

A further feature of the invention resides broadly in the sub-roofing element characterized by the fact that the receiving raised bead 32 is wider than the raised bead 34 it receives. Another feature of the invention resides broadly in the sub-roofing element characterized by the fact that the edge segment of the longitudinal edge adjacent to the receiving raised bead 32 is as wide as the receiving bead 32.

Yet another feature of the invention resides broadly in the sub-roofing element characterized by the fact that the water channel 30 is realized so that it is adjacent to the raised bead 34.

Still another feature of the invention resides broadly in the sub-roofing element characterized by the fact that the longitudinal edges and the eaves-side edge of the sub-roofing element 10 run at the height of the recessed areas 40, 42 of the sub-roofing element 10 and the ridge-side edge runs at the height of the equally-high raised beads 32, 34, 36, 38, whereby all the raised beads 32, 34, 36, 38 have the same height.

A further feature of the invention resides broadly in the sub-roofing element characterized by the fact that there are baffles 44, 46 that form labyrinths on the eaves-side edge.

Another feature of the invention resides broadly in the sub-roofing element characterized by the fact that on the ridge-side edge there is at least one suspension lug 48, 50 for the suspension of the sub-roofing element 10 on a roof batten or similar fixture.

Details of additional inventions which may prove helpful in understanding the instant invention, and which inventions may be used in or in conjunction with the present invention, follow.

This invention relates to a photovoltaic system for a pitched roof covered with roofing plates, with joist elements that can be laid in the ridge-eaves direction, which joist elements can be laid overlapping one another in the ridge-eaves direction, whereby plate-shaped photovoltaic modules having photovoltaic cells are located on the joist elements butted up against one another or adjacent to neighboring roof covering plates, the length of which modules can be greater than the greatest coverage length of a roofing plate, and the width of which can be greater than the system coverage width of the roofing plate.

A photovoltaic system for a pitched roof covered with roofing plates is described in EP-A-0 549 560. The photovoltaic system has frame-like joist elements that can be laid overlapping in the ridge-eaves direction. A plate-shaped photovoltaic module having photovoltaic cells can be inserted into each joist element, whereby the length of the photovoltaic module is greater than the greatest coverage length of a roofing plate, and the width of which is greater than the system coverage width of a roofing plate.

The lateral longitudinal edges of a joist element are realized in the conventional manner for a roofing plate in the form of water channels or bottom baffles and cover channels or top baffles. In this manner, joist elements and roofing plates can be laid in a row parallel to the eaves so that a joist element, with its lateral longitudinal edge which is realized in the form of a cover channel, always covers the lateral longitudinal edge of the neighboring joist element or of the neighboring roofing plate which is realized in the form of a water channel. On the photovoltaic system of the known art, it is not possible to install the photovoltaic modules with butt joints.

FR-A-2 354 430 describes a photovoltaic module that has an eaves-side segment with solar cells and a ridge-side segment that does not have any solar cells. The photovoltaic modules can be laid so that they overlap one another in the ridge-eaves direction, whereby a photovoltaic module is in contact with its ridge-side segment directly on a roof batten that runs in the direction parallel to the ridge, and is covered by the ridge-side segment with the solar cells of the higher photovoltaic module in the ridge-eaves direction. With the ridge-side segment, each photovoltaic module is supported on the segment that does not have the solar cells on the lower photovoltaic module in the ridge-eaves direction. The photovoltaic modules are not fixed to the roof batten on the ridge side, so that on each roof batten there is a hook that is engaged around the ridge-side each of a roof batten and the ridge-side edge of an overlapped photovoltaic module. The hook is inserted between the overlapping photovoltaic modules and is engaged around the eaves-side edge of the overlapping photovoltaic module. In this manner, the hook prevents the displacement of the overlapping photovoltaic module toward the eaves.

An object of the present invention is to create a photovoltaic system of the type described above that can be integrated in the form of a modular system into a roof covering consisting of small-format roofing plates, and one that can also be installed into an already-covered roof essentially without requiring any adaptation work, and also makes it possible to replace photovoltaic modules without the need to perform any installation work on the fastening system.

For this purpose there is provided, on the joist element, a support or lug which, when two joist elements are located in the same slope line, supports the ridge-side joist element on the neighboring joist element in the eaves direction at a height above the surface of the photovoltaic module lying on it so that it can move longitudinally, so that the width of a photovoltaic module can be equal to a whole-number, or integral, multiple of the system overage width of the roofing plate, so that in the ridge-eaves direction, the length of the area inside a photovoltaic module having the photovoltaic cells is preferably shorter than the shortest coverage length of a neighboring roofing plate, so that a photovoltaic module has, at the ridge side, a peripheral segment free of photovoltaic cells, and that a sub-roofing element can be laid on a joist element and below the photovoltaic module, which sub-roofing element preferably has a water drain channel that can be positioned underneath the longitudinal edge of a photovoltaic module.

For the installation of a first photovoltaic module, at least two joist elements located in a row parallel to the eaves and in lines running parallel to one another in the pitch-eaves, or ridge-eaves, direction are necessary. The lowest joist element of a line is fastened to a first roof batten with its ridge-side terminal segment, while its eaves-side terminal segment overlaps a neighboring roofing plate in the eaves direction, and is fastened, by means of a stay, for example, to an eaves-side second roof batten. The first module is then placed on the upper side of the lower joist element. The ridge-side joist element to be laid in the same line is connected in the vicinity of its eaves-side terminal segment with the support of the lower joist element, and is placed on the ridge-side on a ridge-side third roof batten. In this case, the ridge-side joist element is supported at a height above the surface of the first module so that it can be moved to adjust it to the respective distance between the roof battens in the eaves direction, without thereby butting up against the first module.

During this displacement, the ridge-side joist element is positioned so that its ridge-side terminal segment can be fastened on one hand to the third roof batten, and on the other hand, so that its eaves-side terminal segment overlaps the first module on its ridge side. The overlapping eaves-side terminal segment of the joist element nearer the ridge thereby prevents the first module from lifting off the joist element underneath. A second module is then placed over two parallel ridge-side joist elements, and overlaps a ridge-side terminal segment of the first module.

The photovoltaic modules laid on the joist elements in a row parallel to the eaves can be butted up against one another or against neighboring roofing plates. In that case, there is a gap at each joint that must be sealed to prevent the penetration of rainwater. On the photovoltaic system as claimed by the invention, therefore sub-roofing elements as described above can be laid on a joist element and underneath the photovoltaic module, the water channels in which can be positioned underneath the longitudinal edge of a photovoltaic module.

The photovoltaic modules, as a result of their dimensions, can be installed in place of a number of commercially available roofing plates. The length of the photovoltaic modules is advantageously the same as the length of a roofing plate. Because the coverage width of concrete roofing tiles is generally 30 cm and the coverage width of clay roofing tiles is 20 cm, the width of a photovoltaic module can be selected, for example, so that it equals the coverage width of four concrete roofing tiles or six clay roofing tiles, for example, so that the outside dimensions of the photovoltaic module are approximately 38 cm×120 cm. Of that area, an area of 25 cm×114 cm can be occupied by photovoltaic elements, whereby on each longitudinal side there can be a free edge of 3 cm, an edge of 2 cm toward the eaves and 11 cm toward the ridge. Such a photovoltaic module can currently use silicon cells to generate an electric power of approximately 35 Watts. One generator unit should have at least 20 modules.

In an offset arrangement of the roofing plates, these plates are offset in a row by one-half the coverage width with respect to the edge-side or eaves-side neighboring row. If a plurality of modules are laid partly overlapping one another in the ridge-eaves direction, preferably these modules are likewise offset in each row by one-half the coverage width of a roofing plate when laid adjacent to an offset roof covering, or roofing plate, i.e. by approximately 10 to 15 cm. Because the joist elements can be arranged as required in the transverse direction, it is nevertheless possible to lay them in a line, without requiring any compensation on the edges involving the use of half-width roofing plates.

The distance between the roof battens can be varied from roof to roof as a function of the overlap of the roofing plates. The greatest overlap and thus the smallest coverage length is on a roof that has a flat pitch angle. To be able to integrate the photovoltaic system into any desired roof, it is thereby advantageous if the area within a photovoltaic module that contains the photovoltaic cells is not longer than the shortest coverage length. In this manner, the photovoltaic cells will not be in shadows, which can occur in marginal cases if a module designed for a greater coverage length is inadvertently laid on a roof that has a shorter coverage length. The system is thereby extremely easy to use, and can even be installed by do-it-yourselfers.

The installation of the photovoltaic system is particularly simple if, in relation to the level of the roof substructure, the height of the upper side of a joist element is equal to at least the height of the water channel of a laterally-adjacent roofing plate, so that the edge of a photovoltaic module adjacent to the water channel of a roofing plate is laid overlapping the water channel and the edge of a photovoltaic module adjacent to the cover channel of a roofing plate is laid so that it abuts the cover channel.

The photovoltaic system can be integrated particularly easily into a pitched roof covered with commercially available flat roofing plates made of concrete or clay. Flat roofing plates made of concrete are generally 42 cm long, 33 cm wide and 2.2 cm high. They have a coverage width of 30 cm and, depending on the pitch of the roof, a coverage length from 31 to 34 cm. The height of the water channel is 1.2 cm above the lower edge, so that photovoltaic modules can be laid close up against the upper side of the roofing plates.

The support can be located on the ridge-side end on the upper side of a joist element.

The modules can be installed and replaced essentially without requiring the use of tools, if a joist element, on its eaves-side end, has a locator or receptacle that grips the edge of a module, and if the free width between the edge of the locator and the support is equal to at least the length of a module. In this manner, during installation, a module can be pushed up to the supports of the joist element, then laid on the joist elements, and then inserted into the locator in the eaves-direction. The module can be removed by following the reverse sequence of operations. It goes without saying that a locator that grips the eaves-side end of the joist element can also be provided on the module. The electrical connections can be advantageously realized in the form of plug-in connectors.

Preferably, the base of the receptacle, which is realized so that it has approximately the shape of a "U" laid on its side, is higher than the thickness of a structural element inserted into it, so that even in a skewed or warped position of two joist elements supporting the same structural element, essentially no torsional forces will be exerted on the structural element. An elastic or plastic deformable intermediate layer can fill up any spaces in between. There is no need for special measures to secure the installation of the photovoltaic system, if the support of a joist support element is realized in the form of a toggle-like coupling element that is engaged in a slot on the underside of the overlying joist element, to prevent any lifting-off of the overlying joist element.

The photovoltaic modules of the photovoltaic system are particularly flat if they are realized without a frame.

To create a tight seal, in particular for a photovoltaic module, in particular one that has a smooth underside, it is advantageous if the sub-roofing element extends over at least the entire width of a photovoltaic module and has an eaves-side edge that is realized so that it provides protection against penetration by snow and rain, which edge can be located in the overlapping area of two photovoltaic modules. Because there can be a gap of approximately 1.2 cm in the overlapping area of two modules approximately 1 cm thick on a roofing plate 2.2 cm thick, the sub-roofing element can be used to seal this gap.

This sealing is only effective against the penetration of water if the sub-roofing element has ventilation openings on its eaves-side edge. A labyrinth can be connected to these openings that also provides protection against blowing snow. Ventilation must be used, however, to conduct a cooling air flow along the underside of a photovoltaic module. Such an air flow prevents excessive heating and the related reduction in the output of a photovoltaic module. The heated air discharged on the ridge-side edge is advantageously guided along the underside of the following sub-roofing element, so that heated air does not come into contact with any other photovoltaic modules until it reaches the ridge.

Figure 7:
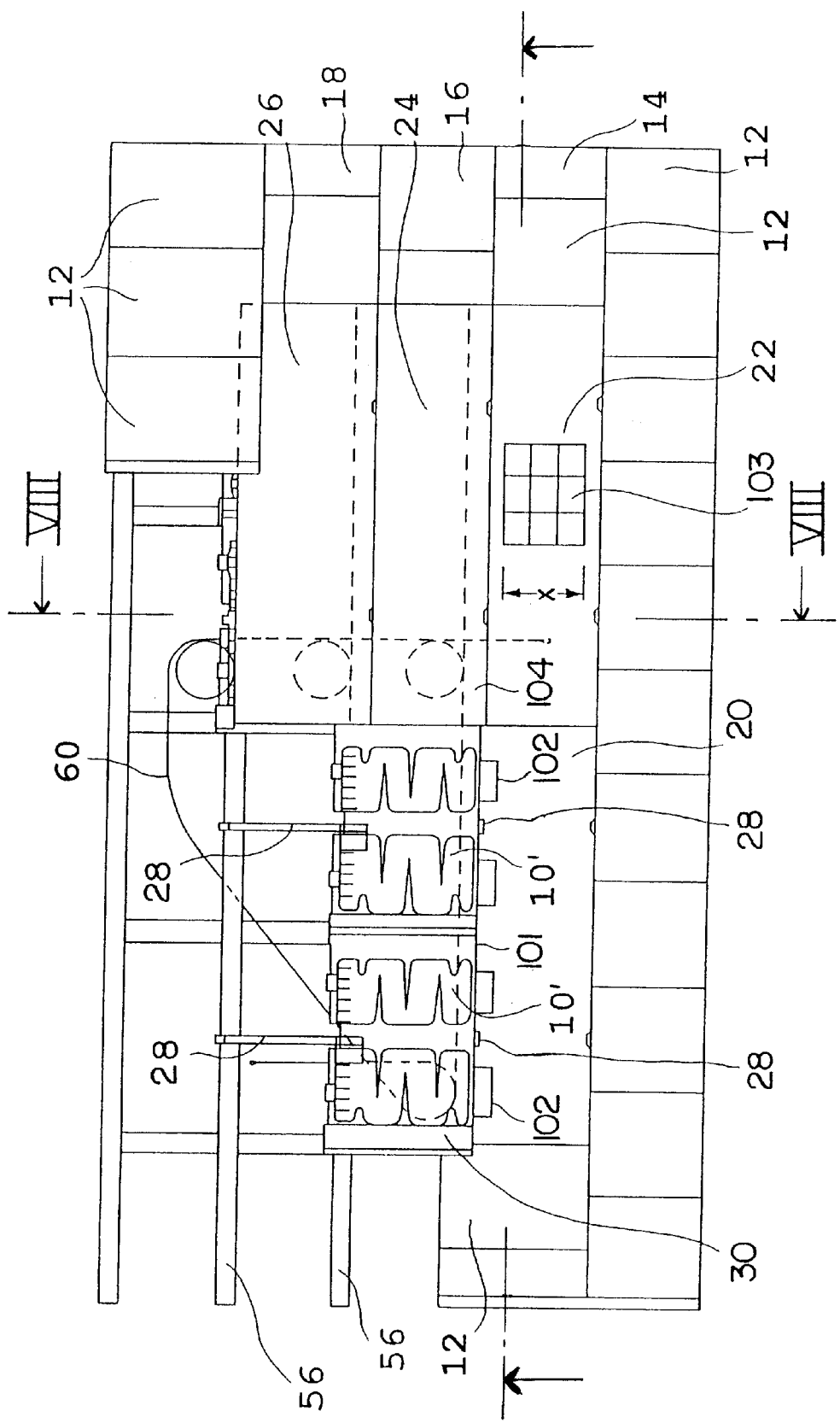
FIG. 7 shows the photovoltaic system illustrated in FIG. 1, with additional schematic details.

FIG. 7 shows some additional details of the system shown in FIG. 1. For example, FIG. 7 shows the electrical connection of the individual photovoltaic modules 20, 22, 24, 26, with one another and with other modules not shown here, there are cables 60, which are connected to the modules by means of plug-in connections.

FIG. 7 also shows schematically additional possible features of at least one embodiment of the present invention, wherein the sub-roofing elements 10' extend over the entire width of a photovoltaic module and can have an eaves-side edge realized so that it provides a seal 101 against rain and snow, which edge can be located in the overlapping area between two photovoltaic modules 24, 22, or 26, 24. Further, in at least one embodiment the sub-roofing element 10' can have ventilation openings 102 on its eaves-side edge. Further, FIG. 7 shows schematically that in one possible embodiment, the length X of the area inside a photovoltaic module 20, 22, 24, 26 having the photovoltaic cells 103 can be shorter than the shortest coverage length of a neighboring roofing plate 12, so that, on the side nearer the ridge, a photovoltaic module 20, 22, 24, 26 has an edge segment 104 that is free of photovoltaic cells.

Figure 8:
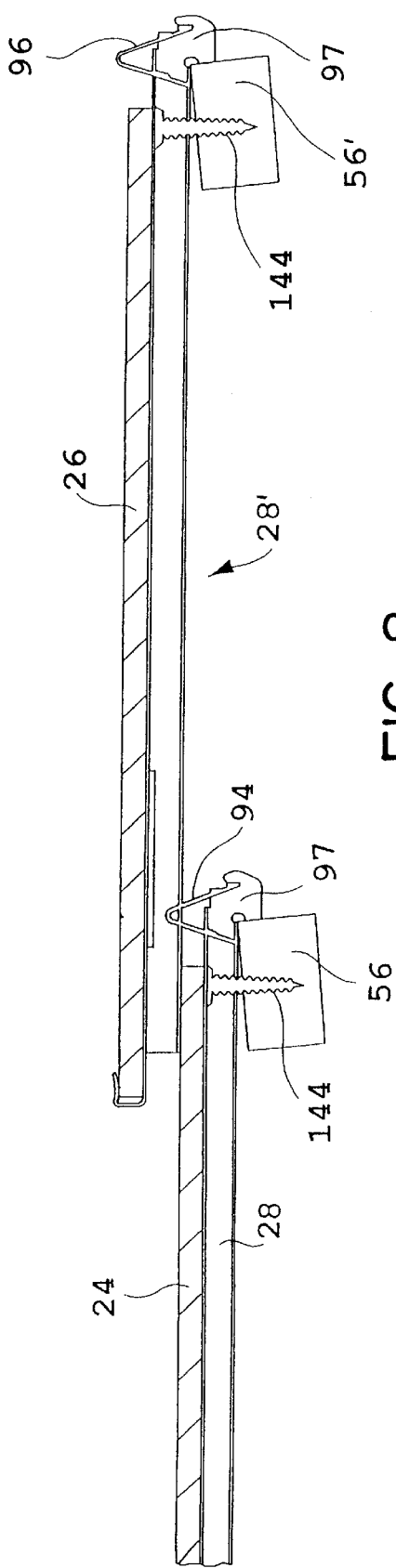
FIG. 8 shows the photovoltaic system illustrated in FIG. 7 in a longitudinal section along Line VIII—VIII.

FIG. 8 shows the photovoltaic system illustrated in FIG. 1 in a longitudinal section along Line VIII—VIII, whereby only the photovoltaic modules 24 and 26 are shown. These modules are supported on joist elements 28 and 28' respectively. Each of the joist elements 28, 28' lies with its ridge-side end in contact with a roof batten 56 and 56' respectively, and is fastened to the roof batten by means of a fastener 144 realized in the form of a screw. On the joist element 28', by way of example, the figure shows the support of the eaves-side end, which is theoretically the same for all the joist elements. The eaves-side end can be moved longitudinally and is supported by means of the lug 94 on the ridge-side end of the underlying joist element 28.

On the eaves-side end, as shown here on the joist element 28', there is attached a U-shaped channel member 92, which provides a receptacle which grips the eaves-side edge of the overlying photovoltaic module 26 in the manner of a claw. On the eaves-side end of the joist element 28', the figure shows by way of example, the support which allows movement in the longitudinal direction, which is basically the same for all joist elements, by means of a support 94 on the ridge-side end of the underlying joist element 28. On the ridge-side end of the joist element 28', there is an identical support 96 for the next overlapping joist element.

The support of the joist element 28' nearer the ridge is provided at a height that is at least equal to the thickness of the module 24. In this manner, the joist element 28' nearer the ridge can be displaced during installation with respect to the lower joist element 28 and the overlying module 24 toward the eaves, until its eaves-side terminal segment overlaps the module 24. The module 26 lying on top of the joist element 28' nearer to the ridge, on account of the eaves-side terminal segment of the joist element 28' nearer the ridge, is spaced above the module 24 and overlaps a ridge-side edge segment of the module 24.

To further explain, in one possible embodiment the joist element 28' which is disposed nearer to the ridge can be displaced longitudinally during installation so as to position it on one of the existing roof battens. To accomplish this, in at least one embodiment, the support 94 of the joist element 28' is configured to support the joist element 28' at a height that at least equals the thickness of the module 24 disposed in the row immediately below. This arrangement allows the joist element 28' to overlap the lower module 24 and to be displaced longitudinally towards the eaves until the joist element 28' can be desirably positioned on a roof batten.

One feature of the invention resides broadly in the photovoltaic system for a pitched roof covered with roofing plates, 12 with joist elements 28 that can be laid in the ridge-eaves direction and can be laid so that they overlap in the ridge-eaves direction, whereby plate-shaped photovoltaic modules 20, 22, 24, 26, that have photovoltaic cells are butted up against one another or are adjacent to neighboring roofing plates, the length of which modules is greater than the greatest coverage length of a roofing plate 11, 13, and the width of which is greater than the system coverage width of the roofing plate 12, characterized by the fact that on the joist element 28, 28' there is a support 94, which, when two joist elements 28, 28' are located in the same slope line, supports the ridge-side joist element 28' on the neighboring joist element 28 adjacent in the eaves direction at a height above the surface of the photovoltaic module 24 lying on top of it, so that the joist element 28' can be moved longitudinally, that the width of a photovoltaic module 20, 22, 24, 26, is equal to a whole-number multiple of the system coverage width of the roofing plate 12, that in the ridge-eaves direction, the length of the area inside a photovoltaic module 20, 22, 24, 26, having the photovoltaic cells is shorter than the shortest coverage length of a neighboring roofing plate 12, so that, on the side nearer the ridge, a photovoltaic module 20, 22, 24, 26, has an edge segment that is free of photovoltaic cells, and that a sub-roofing element 10 can be laid on a joist element 28 and underneath the photovoltaic module 20, which has a water channel 30 that can be positioned underneath the longitudinal edge of a photovoltaic module 20.

Another feature of the invention resides broadly in the photovoltaic system characterized by the fact that with respect to the plane of the substructure of the roof, the height of the upper side of a joist element 28, 28' is at least equal to the height of the water channel 58 of a laterally adjacent roofing plate 12, so that a photovoltaic module 22 to be laid on the water channel side of an adjacent roofing plate overlaps the water channel 58 and a photovoltaic module 20 to be laid on the cover channel side of an adjacent roofing plate 12 is butted up against the cover channel 54.

Other features of the preferred embodiments of the invention are that: the photovoltaic system is characterized by the fact that the support 94 is located on the ridge-side end on the upper side of a joist element 28;

A joist element 28', on its eaves-side end, has a hook-like channel member providing a receptacle 92 that grips the edge of a photovoltaic module 26, and that the available width between the edge of the receptacle 92 and the support 96 is at least equal to the length of a module 26;

The support 94 of a joist element 28 is realized in the form of a toggle-type coupling element which is engaged in a slot on the underside of the overlying joist element 28', to prevent the lifting-off of the overlying joist element; and The photovoltaic modules 20, 22, 24, 26, are realized without frames.

Yet another feature of the invention resides broadly in the photovoltaic system characterized by the fact that sub-roofing elements 10' extend over the entire width of a photovoltaic module and have an eaves-side edge realized so that it provides a seal against rain and snow, which edge is located in the overlapping area between two photovoltaic modules 24, 22 or 26, 24.

Still another feature of the invention resides broadly in the photovoltaic system characterized by the fact that the sub-roofing element 10' has ventilation openings on its eaves-side edge.

To aid in the understanding of the present invention the following text and figures has also been added, which better explain some of the possible structures which may be found in and/or used in conjunction with at least one embodiment of the present invention.

On a photovoltaic module that has a length of 38 cm and a width of 120 cm, for example, the transverse distance between the joist elements of a course parallel to the eaves is approximately 60 cm. When a plurality of modules are laid in overlapping fashion between the ridge and the eaves, a plurality of joist elements can be located in a single slope line.

The length of a joist element is preferably greater than the length of a structural element, and the module in turn can be longer than the longest coverage length of the neighboring roofing plates.

The lug that transmits the load from the base-side terminal segment of an overlapping joist element to the overlapped joist element can be realized in a particularly stable manner if it is located on the upper side of the joist element in the vicinity of its ridge-side terminal segment. This terminal segment projects beyond the ridge-side edge of the structural element.

The joist element can be manufacted in the form of a stamped sheet metal part, if the lug is, for example, realized in the form of a separate component. The lug, for example, can be realized in the form of a bracket made out of bent sheet metal, whereby the ends of the legs are firmly connected to the joist element.

No additional stays are necessary if the upper terminal segment of the lugs is realized in the form of a coupling element that can be connected with a correspondient coupling part on the joist element to be supported nearer the ridge, and so that it can be displaced in the longitudinal direction, to prevent the joist element nearer the ridge from lifting up.

The fabrication of a joist element with a lug can be particularly simple if, for example, the lug can be fastened to the joist element by means of locking connection elements.

A form-fitting and longitudinally movable connection between the lug and the joist element nearer the ridge can be created, for example, if the joist element, at least in the vicinity of its eaves-side terminal segment, has a longitudinal slot and the lug has a toggle-like extension. The toggle-like extension of a lug can project through the slot of the neighboring joist element nearer the ridge. This longitudinally movable coupling prevents the liftoff of the joist element nearer the ridge, but in the longitudinal direction it represents a movable bearing, so that variations in the distances between the roof battens can always be compensated.

An ecomomical realixation of the joist element is possible if it is realized in the form of a thin-walled profile, preferably in the form of a hollow profile. Preferably, the joist element over the greater part of its length is realixed in the form of a C-section open on the bottom.

Any damage to the underside of the structural element by a fastening element for the windproof fastening of the joist element can be prevented if, on the ridge-side end of the joist element, there is a bearing for a fastening element for the fastening to the roof substructure. If a screw is used as the connecting element, it is recommended that a countersink be provided on the upper side of the joist element to hold the screw head.

The correctly fitting installation of the plate-shaped structural elements or modules is facilitated if, on the ridge-side end of a joist element, on the underside, there is a projection that makes it possible to hang the joist on the roof substructure. This projection acts in a manner that is similar to a hanging lug of a roofing plate, in that it adjusts the joist element in the longitudinal direction with respect to the ridge-side upper edge of the roofing batten. The eaves-side edge of the structural element is held by the receptacle of the joist element. If the distance between the projection and the base of the receptacle is equal to the distance between the suspension lug and the eaves-side edge of a neighboring roofing plate, the result is a geometric position for structural elements, in particular for photovoltaic modules, installed using the joist elements claimed by the invention, that is the same as for the neighboring roofing plates, regardless of the distance between the roofing battens and the actual overlap provided on the roof.

The accompanying drawings illustrate at least one preferred exemplary embodiment of the joist element, which is explained in greater detail below in reference to the following figures.

Figure 9:
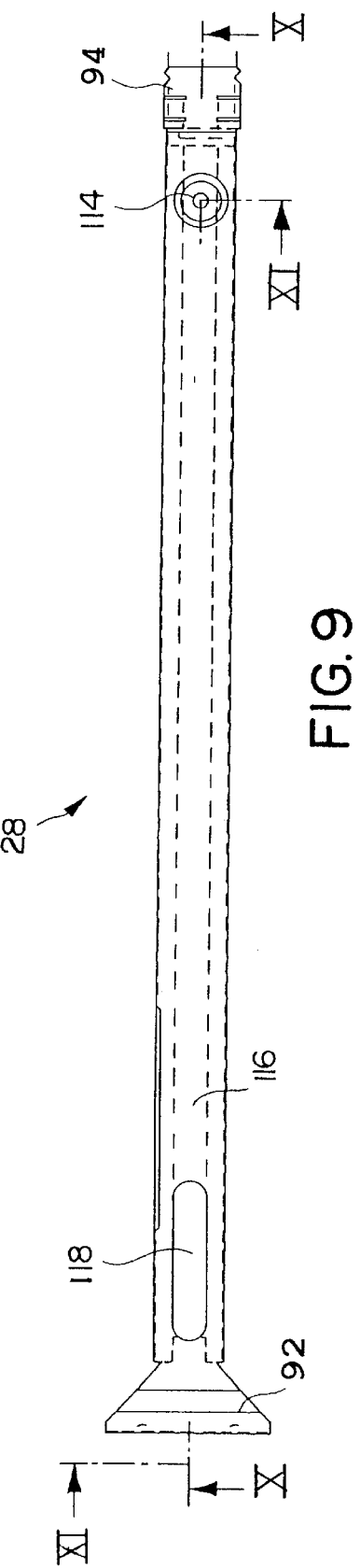
FIG. 9 shows a joist element in an overhead view.

FIG. 9 shows a joist element 10 stamped out of stainless steel and bent into the desired shape. On its ridge-side end there is a lug 94, on which an identical neighboring joist element can be placed. As a bearing 114 for a fastening means for fastening to a roof batten, there is a countersink on the upper side of the joist element 28, in which the head of a screw, for example, can be placed. The joist element 28 is realized over almost its entire length in the form of a C-shape that is open on the bottom, and which has a slot 116 on the underside. In the vicinity of the eaves-side terminal segment, there is a slot 118 on the top, through which the fastening means of a joist element located below it can be reached. On the eaves-side end there is a U-shaped receptacle 92 for a structural element. The receptacle 92 is wider than the C-shape of the joist element 28.

Figure 10:
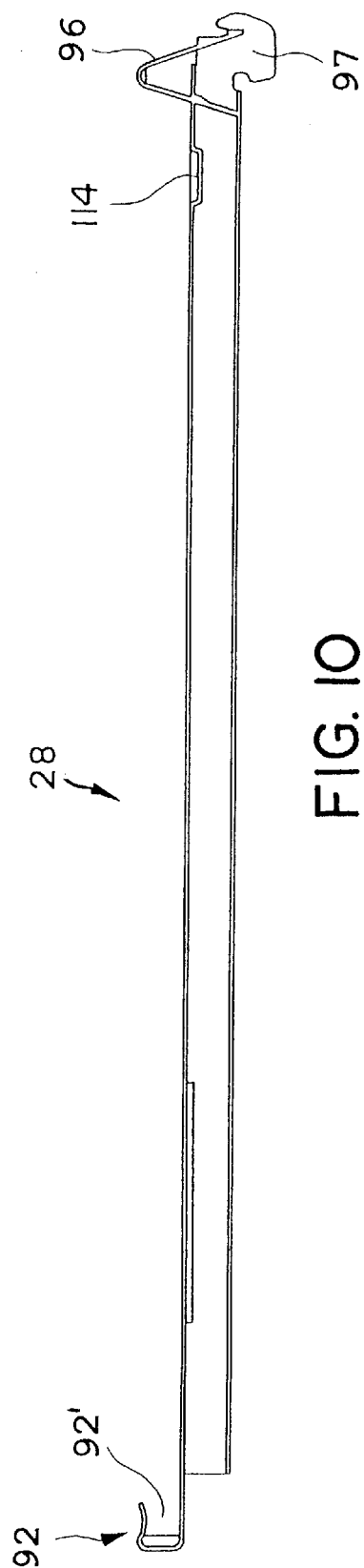
FIG. 10 shows the joist element illustrated in FIG. 9, in a longitudinal section along Line X—X.

FIG. 10 illustrates the arrangement of the lug 96 and the receptacle 92 in longitudinal section. The receptacle 92 comprises a U-shaped channel member attached to the joist element and which projects beyond the C-shaped area of the joist element 28. Consequently, the material can be deformed under the effect of large torsional forces as a result of twisted roof battens, and thus prevent damage to the structural element installed on them. The base of the U-shaped receptacle 92 is lined with a strip 92' which can be made of elastic material. The lug 96 is realized in the form of a bracket made of bent sheet metal, whereby the ends of the legs are fastened to the ridge-side end of the joist element 28. The edge of the bent portion of the lug 96 runs at about a right angle to the longitudinal axis of the joist element 28. Underneath the lug 96, the figure shows a projection 97 which can be hung on a roof batten like the suspension lug of a roofing plate.

Figure 11:
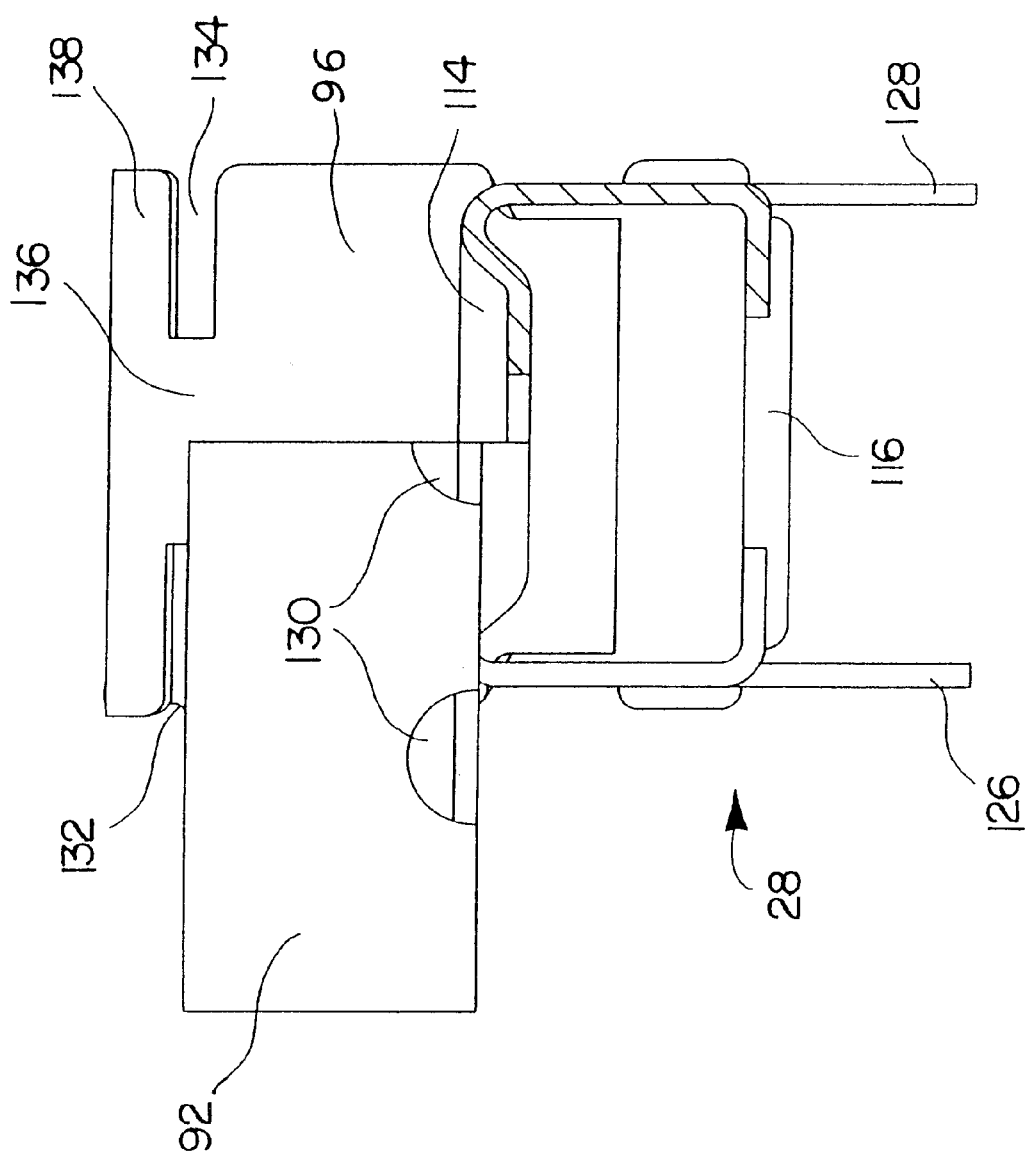
FIG. 11 shows the joist element illustrated in FIG. 9, in a section along Line X1—X1.

FIG. 11 shows a partial cross section of the joist element 28 along line XI—XI in FIG. 9. The left half of the figure shows the realization of the receptacle 92 and the right half of the figure shows the realization of the lug 96. On the underside of the joist element 28, there are projections 126, 128 that project beyond the ridge-side end. In the vicinity of the lower edge of the receptacle 92, there are penetrations 130 that make possible the discharge of fluid.

On the bracket-shaped lug 96, at a short distance from the upper edge, there are slots 132, 134 that begin on both sides of the edges. The upper terminal segment of the lug 96 can thereby be realized in a simple manner in the form of a toggle-like extension 138, whereby the material between the slots 132, 134 forms the neck 136 and the wall in the vicinity of the upper edge of the toggle. A neighboring joist element to be supported that is identical to the joist element 28 can be inserted into the slots 132, 134, so that the neck 136 rests in a form-fitting manner in the slot 116, and the toggle-like extension 138 rests inside the neighboring joist element.

Another feature of the invention resides broadly in the joist element characterized by the fact that on the ridge-side end of the joist element 28, there is a bearing 114 for a fastening element 144 for fastening to the roof substructure 56, 56'.

Yet another feature of the invention resides broadly in the joist element characterized by the fact that on the ridge-side end of a joist element 28, 28', on the underside, there is a projection 97 which makes it possible to hang the joist element 28 on the roof substructure 56, 56'.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The published PCT application to which the present U.S. application corresponds, namely PCT/DE97/00647, the published Fed. Rep. of Germany application from which it claims priority 196 12 490.5, as well as all documents cited in the International Search Report issued thereon, including European Patent No. EP 0547 285 A issued to Rieter Werkle Haendle on Jun. 23, 1993, Fed. Rep. of Germany Patent No. DE 33 14 637 A issued to BM Chemie Kunststoff on Nov. 17, 1983, Swiss Patent No. CH 682 831 A issued to Rolf on Nov. 30, 1993, and Great Britain Patent No. GB 2 266 903 A issued to Redland Eng. LTD on Nov. 17, 1993, are hereby expressly incorporated by reference as if set forth in their entirety herein.

The published PCT application to which the present U.S. application corresponds, namely PCT/DE97/00648, the published Fed. Rep. of Germany application from which it claims priority 196 12 489.1, as well as all documents cited in the International Search Report issued thereon, including European Patent No. EP 0549 560 A issued to Sedelmayer on Jun. 30, 1993, French Patent No. 2 354 430 A issued to Radiotechnique Compelec on Jan. 6, 1978, Fed. Rep. of Germany Patent No. DE 44 08 508 A issued to Sesol Ges Fuer Solare Systeme on Sep. 21, 1995, Fed. Rep. of Germany Patent No. DE 92 09228 U issued on Nov. 5, 1992, U.S. Pat. No. 4,040,867 issued to Forestieri et al. on Aug. 9, 1977, Fed. Rep. of Germany Patent No. DE 33 14 637 A issued to BM Chemie Kunststoff on Nov. 17, 1983, and Fed. Rep. of Germany Patent No. DE 43 32 873 A issued to Rieter Werke Haendle on Mar. 30, 1995, are hereby expressly incorporated by reference as if set forth in their entirety herein.

The published PCT application to which the present U.S. application corresponds, namely PCT/DE97/00646, the published Fed. Rep. of Germany application from which it claims priority 196 12 488.3, as well as all documents cited in the International Search Report issued thereon, including Federal Republic of Germany Patent No. DE 151 738 C issued to Internat. Maatschappij TOT Exploitatie van Gebreveteerde on May 31, 1994, Fed. Rep. of Germany Patent No. DE 221 279 C issued to Damm on Apr. 23, 1910, International Application No. WO 94 24384 A issued to Waddington on Oct. 27, 1994 (and its U.S. counterpart, U.S. Pat. No. 5,642,596 A, issued on Jan. 7, 1997), and French Patent No. FR 2 491 112 A issued to Gross on Apr. 2, 1982, are hereby expressly incorporated by reference as if set forth in their entirety herein.

The components disclosed in the various publications, disclosed or incorporated by reference herein, may be used in the embodiments of the present invention, as well as, equivalents THe appended drawings in their entirety, including all dimension, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Some examples of U.S. Patents which could possibly be used in conjunction with the present invention are as follows:

Some examples of photo voltaic systems are:

| U.S. Pat. No. | Assignee | Inventor(s) | Title |
| --- | --- | --- | --- |
| 5449413 | Optical Coating Lab., Inc. | Beauchamp et al. | UV/IR reflecting solar cell cover |
| 5460659 | Spectrolab, Inc. | Krut | Concentrating photovoltaic module and fabrication method |
| 5385614 | Photon Energy | Albright et al. | Series interconnected photo- |

-continued

| U.S. Pat. No. | Assignee | Inventor(s) | Title |
|---|---|---|---|
| 5385615 | United Solar Tech., Inc. | Horne | voltaic cells and method for making same Solar energy system |
| 5401331 | Midwest Research Institute | Ciszek | Substrate for thin silicon solar cells |
| 5403405 | JX Crystals, Inc. | Fraas et al. | Spectral control for thermophotovoltaic generators |
| 5415700 | State of Oregon | Arthur et al. | Concrete solar cell |
| 5437735 | United Solar Systems Corp. | Younan et al. | Photovoltaic shingle system |
| 5445177 | | Laing & Laing | Platform for the utilization of solar power |
| 5453134 | Semi-conductor Energy Lab. Co., Ltd. | Arai et al. | Solar cell |
| 5468304 | Texas Instr. Inc. | Hammerbacher | Output-increasing, protective cover for a solar cell |
| 5474621 | Energy Conversion Devices, Inc. | Barnard | Current collection system for photovoltaic cells |
| 5409549 | Canon Kabushiki Kaisha | Mori | Solar cell module panel |
| 5408990 | | Edling et al. | Solar energy collection panel assembly |
| 5394075 | Hughes Aircraft Co. | Ahrens et al. | Spacecraft bus regulation using solar panel position |
| 5379753 | | Noennich | Solar panel control apparatus |
| 5379596 | | Grayson | Self-contained hand-held solar chest |
| 5400986 | Martin Marietta Corp. | Amore et al. | Optical solar reflector and mounting method |
| 5439531 | | Finkl | Method and system for maintaining the efficiency of photo-voltaic cells |

Some examples of solar energy collectors are:

| U.S. Pat. No. | Assignee | Inventor | Title |
|---|---|---|---|
| 5411015 | Collins Starnes Assoc. Ltd. | Starnes | Radiation collectors |
| 5431149 | | Fossum & Fossum | Solar energy collector |
| 5452710 | Solar Attic, Inc. | Palmer | Self-sufficient apparatus and method for conveying solar heat energy from an attic |
| 5477848 | | Reed | Solar collector expansion assembly |
| 5388567 | | Hodak | Solar heating panel |

Examples of roofs and/or roofing structures or materials that may possibly to be used in at least one embodiment of the present invention may be found in U.S. Pat. No. : 4,929,179 issued on May 29, 1990 to D. Breidenbach, et al.; U.S. Pat. No. 5,155,966 issued on Oct. 20, 1992 to D. Breidenbach, et al.; U.S. Pat. No. 4,550,791 issued to E. Isakov on Nov. 5, 1985; U.S. Pat. No. 5,237,352 issued on Aug. 17, 1993 to C. Grosser et al.; and U.S. Pat. No. 5,027,576 issued on Jul. 2, 1991 to L Gustavsson; and U.S. patent application Ser. No.: 07/530,767 filed on May 25, 1990 having, inventors D. Breidenbach et al.; U.S. Ser. No. 08/691,978 filed on Aug. 2, 1996, having inventor E. Isakov; U.S. Ser. No. 06/809,073 filed on Dec. 13, 1985, having inventor U. Hintzen; U.S. Ser. No. 07/786,040 filed on Oct. 31, 1991, having inventor L. Ballu, et al.; U.S. Ser. No. 08/996,827 filed on Dec. 23, 1997, having inventor K. Hofinann; U.S. Ser. No. 09/002,455 filed on Jan. 2, 1998, having inventor H. Rapp et al.; and U.S. Ser. No. 09/036,463 filed on Mar. 6, 1998, having inventors A. Drechsler et al.

Examples of seals and/or sealing structures that may possibly be used in conduction with at least one embodiment of the present invention might be found in U.S. Pat. No. : 5,176,408, issued Jan. 5, 1993, to R. Pedersen; U.S. Pat. No. 5,177,139, issued on Jan. 5, 1993, to K. Klaar, et ano; U.S. Pat. No. 5,184,869, issued on Feb. 9, 1993, to K. Bauer; and U.S. Pat. No. 5,347,776, issued on Sep. 20, 1994, to J. Skoff.

All of the patents, patent applications and publications recited herein, and in the Declaration attached hereto, are hereby incorporated by reference as if set forth in their entirety herein.

The corresponding foreign and international patent publication applications, namely, Fed. Rep. of Germany Patent Application No. 196 12 489.1, filed on Mar. 29, 1996, and International Application No. PCT/DE97/00648, filed on Mar. 27, 1997, having inventors Manfred RINKLAKE and Norbert ROSLER, and International Publication No. WO 97/37388 published on Oct. 7, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The corresponding foreign and international patent publication applications, namely, Fed. Rep. of Germany Patent Application No. 196 12 490.5, filed on Mar. 29, 1996, and International Application No. PCT/DE97/00647, filed on Mar. 27, 1997, having inventors Manfred RINKLAKE and Norbert ROSLER, and International Publication No. WO 97/37387 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The corresponding foreign and international patent publication applications, namely, Fed. Rep. of Germany Patent Application No. 196 12 488.3, filed on Mar. 29, 1996, and International Application No. PCT/DE97/00646, filed on Mar. 27, 1997, having inventors Manfred RINKLAKE and Norbert ROSLER, and International Publication No. WO 97/37091 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A sub-roofing element in combination with a joist element and capable of supporting an energy collection module, the roof having a peak and an upper ridge portion disposed adjacent the roof peak and an eaves portion disposed below the roof peak, which ridge portion and eaves portion define a ridge-eaves direction, which energy collection module is fastened to the roof by at least one said joist element disposed in the ridge-eaves direction, said sub-roofing element being configured to be disposed upon one of the at least one joist element and, at least in part, beneath the energy collection module, said sub-roofing element comprising:

a sheet of substantially water-proof material which is formed to provide a series of raised and recessed hollow beads extending in the ridge-eaves direction, said beads providing:

two outer raised beads including a first outer raised bead adjacent a first edge of the sub-roofing element and a second outer raised bead adjacent a second edge of the sub-roofing element;

at least one water channel; and at least one raised inner bead;

said first outer raised bead having an underside configured to hold the top of a second outer raised bead adjacent the second edge of another substantially identical roofing element;

said inner raised bead having a recessed underside with a width dimension;

said at least one inner raised bead having an underside configured and disposed to receive the joist element disposed in the ridge-eaves direction and having an upper surface for receiving the energy collecting module, the joist element having a width dimension;

said width dimension of the underside of said inner raised bead being configured to be substantially greater than the width dimension of said joist element to permit the shifting of said sub-roofing element in a direction substantially transverse to said ridge-eaves direction, upon the placement of said sub-roofing element upon the joist element;

said width dimension of the underside of said inner raised bead being sufficient to permit the shifting of said sub-roofing element to position one of said at least one water channel beneath an edge, along the ridge-eaves direction, of the energy collecting module;

said substantially water-proof material comprising a plastic film;

said joist element having a member attached thereto providing a receptacle for an edge of said module;

said inner raised bead including an eaves-side terminal segment;

said sub-roofing element, at least in the vicinity of said eaves-side terminal segment of said inner raised bead, having a penetration connecting upper and lower surfaces of said terminal segment; and said penetration being of sufficient size to permit the insertion of said member attached to the joist element.

2. A sub-roofing element in combination with a joist element and an energy collection module which is supported on said joist element and sub-roofing element, the roof having a roof peak and an upper ridge portion disposed adjacent the roof peak and an eaves portion disposed below the roof peak, which ridge portion and eaves portion define a ridge-eaves direction, which energy collection module is fastened to the roof by at least one said joist element which is disposed in the ridge-eaves direction, said sub-roofing element being configured to be disposed upon one of the at least one joist element and, at least in part, beneath the energy collection module, said sub-roofing element comprising;

a sheet of substantially water-proof material which is formed to provide a series of raised and recessed hollow beads extending in the ridge-eaves direction, said beads providing;

two outer raised beads including a first outer raised bead adjacent a first side of the sub-roofing element and a second outer raised bead adjacent a second side of the sub-roofing element, at least one water channel and at least one raised inner bead;

said first outer raised bead having an underside configured to hold the top of a second outer raised bead of an adjacent identical sub-roofing element, said inner raised bead having an underside with a width dimension;

said at least one inner raised bead having a recessed underside configured and disposed to receive the joist element disposed in the ridge-eaves direction and having an upper surface for receiving the energy collecting module, the joist element having a width dimension;

said width dimension of the underside of said inner raised bead being configured to be substantially greater than the width dimension of said joist element to permit the shifting of said sub-roofing element in a direction substantially transverse to said ridge-eaves direction, upon the placement of said sub-roofing element upon the joist element;

said width dimension of the underside of said inner raised bead being sufficient to permit the shifting of said sub-roofing element to position one of said at least one water channel beneath an edge, along the ridge-eaves direction, of the energy collecting module.

* * * * *

UNITED STATES PATENT AND TRADEMARK OFFICE
CERTIFICATE OF CORRECTION

PATENT NO. : 6,182,404 B1  
DATED : February 6, 2001  
INVENTOR(S) : Manfred Rinklake and Norbert Rösler Page 1 of 1

It is certified that error appears in the above-identified patent and that said Letters Patent is hereby corrected as shown below:

<u>Title page,</u>  
Item [56], under the FOREIGN PATENT DOCUMENTS section, in the first reference cited, after '3314637' delete "11/1993" and insert -- 11/1983 --.

<u>Column 8,</u>  
Line 63, after 'system', delete "overage" and insert -- coverage --.

Signed and Sealed this

Fifth Day of February, 2002

Attest:

Attesting Officer

JAMES E. ROGAN  
*Director of the United States Patent and Trademark Office*